United States Patent
Shih et al.

(10) Patent No.: US 7,035,534 B2
(45) Date of Patent: Apr. 25, 2006

(54) PHOTOGRAPHIC LIGHTMETER-REMOTE, SYSTEM, AND METHOD

(75) Inventors: Willy C. Shih, Pittsford, NY (US); Stephen A. Noble, Fairport, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 115 days.

(21) Appl. No.: 10/869,016

(22) Filed: Jun. 16, 2004

(65) Prior Publication Data
US 2005/0281549 A1    Dec. 22, 2005

(51) Int. Cl.
*G03B 15/05* (2006.01)

(52) U.S. Cl. .................. 396/57; 396/157; 396/182; 356/218

(58) Field of Classification Search ............ 396/56–59, 396/157, 182, 213; 348/211.99, 211.2, 211.4, 348/211.9, 362, 363, 366, 370, 371; 356/213, 356/218, 222
See application file for complete search history.

(56) References Cited

U.S. PATENT DOCUMENTS

| | | | | |
|---|---|---|---|---|
| 4,420,773 | A | 12/1983 | Toyoda et al. | 386/118 |
| 4,460,263 | A * | 7/1984 | Gfeller et al. | 396/157 |
| 4,534,629 | A | 8/1985 | Bogle et al. | 352/140 |
| 4,636,052 | A | 1/1987 | Bowsher | 396/57 |
| 4,655,576 | A * | 4/1987 | Yuasa et al. | 396/157 |
| 4,816,855 | A * | 3/1989 | Kitaura et al. | 396/57 |
| 4,884,094 | A * | 11/1989 | Kitaura et al. | 396/57 |
| 5,446,512 | A * | 8/1995 | Mogamiya | 396/56 |
| 5,517,276 | A | 5/1996 | Higaki et al. | 396/56 |
| 6,466,742 | B1 | 10/2002 | Baron | 396/59 |
| 6,900,886 | B1 * | 5/2005 | Yuasa | 356/218 |

FOREIGN PATENT DOCUMENTS

GB    2 334 591 A    8/1999

OTHER PUBLICATIONS

Sekonic L-358 Flash Master (on-line), 2003, Retrieved from the Internet: URL: http://www.sekonic.com/Products/L-358.html.
Sekonic L-558 DualMaster (online), 2003, Retrieved from the Internet: URL: http://www.sekonic.com/Products/L-558.html.

* cited by examiner

Primary Examiner—W. B. Perkey
(74) Attorney, Agent, or Firm—Robert L. Walker

(57) ABSTRACT

A lightmeter-remote is usable in a system with a remotely settable camera and a plurality of remotely settable photolamps. The lightmeter-remote has a body, and a lightmeter, exposure controller, and transmitter disposed in the body. The exposure controller can be selectively actuated to set aperture, exposure time, and gain parameters of the camera and to set output parameters of each of the photolamps. The transmitter operatively and wirelessly connects the camera and photolamps with the exposure controller. The lightmeter-remote can have a plurality of lighting models, each providing user instructions defining a lighting setup and requiring one or more light measurements.

24 Claims, 11 Drawing Sheets

PHOTOGRAPHIC LIGHTMETER-REMOTE, SYSTEM, AND METHOD

FIELD OF THE INVENTION

The invention relates to photography and photographic equipment and more particularly relates to a photographic lightmeter-remote and related systems and methods.

BACKGROUND OF THE INVENTION

Professional photographers use multiple sources of light to provide pleasing effects in portraits and other photographs. Most amateur photographers limit themselves to existing light and/or a flash unit that is attached to the camera. It is likely that amateur photographers are deterred not so much by the cost of lightmeters and other lighting-related equipment, but rather by the commitment of time and effort required before the equipment provides a noticeable benefit to the amateur's photography. It would thus be desirable to provide equipment that is simpler and easier to use, particularly for an untrained person.

One simplification in the set up of a photographic shot with multiple lighting sources is to reduce the physical effort required for set up. U.S. Pat. No. 4,636,052 discloses a lightmeter, which measures a light value and wirelessly transmits that information to a camera that is equipped to receive the information and alter capture settings based upon that information. This lightmeter allows remote use to set up camera exposure parameters in the same way as a lightmeter included as a part of the camera. This is similar in effect to the spot meter function provided as a light metering option in many cameras.

The publications:
"L-558 DUALMASTER" [online], 2003, [retrieved on Mar. 18, 2004]. Retrieved from the Internet: URL: http://www.sekonic.com/Products/L-558.html and
"Sekonic L-358 Flash Master", [online], 2003, [retrieved on Mar. 18, 2004]. Retrieved from the Internet: URL: http://www.sekonic.com/Products/L-358.html disclose L-358 and L-558 lightmeters having a radio transmitter module. It is stated that the lightmeters incorporating the module can use it to wirelessly trigger electronic flash units and/or cameras. The flash units can be triggered simultaneously or individually. The L-358 is indicated as being capable of analyzing a simultaneous reading of flash and ambient light to indicate on a display a percentage of flash present, f-stop and shutter speed.

These publications disclose lightmeters that each provide a measure of convenience, in that the photographer can walk back and forth less. U.S. Pat. No. 4,636,052, in effect, takes a lightmeter out of the camera and places it in the user's hand. The Sekonic references provide remote triggers for the camera and photolamps. The lightmeters of these references rely on the photographer to set camera exposure parameters based upon available lightmeter readings, or, in the case of U.S. Pat. No. 4,636,052, rely upon the controller within the camera to set those parameters based upon a lighting value. The camera must be manually settable or have a capability of setting appropriately to the transmitted lighting value.

In the references, the user is relied upon to determine when conditions are appropriate. In U.S. Pat. No. 4,636,052 the user sets up lighting using the light meter and, when satisfied based upon his or her judgement, transmits a lighting value from the light meter to the camera. Similarly, the Sekonic lightmeters provide remote controls and data on lighting combinations, but the photographer judges when lighting is right for a particular shot. These approaches are very suitable for professional photographers and advanced amateurs who are knowledgeable about lighting, but are not particularly suitable for a user with limited experience who wants to learn by doing.

It is therefore desirable to provide an improved piece of equipment that can act as a lightmeter and can provide camera exposure setup functions and, optionally, user instructions.

SUMMARY OF THE INVENTION

The invention is defined by the claims. The invention, in broader aspects, provides a lightmeter-remote is usable in a system with a remotely settable camera and a plurality of remotely settable photolamps. The lightmeter-remote has a body, and a lightmeter, exposure controller, and transmitter disposed in the body. The exposure controller can be selectively actuated to set aperture, exposure time, and gain parameters of the camera and to set output parameters of each of the photolamps. The transmitter operatively and wirelessly connects the camera and photolamps with the exposure controller. The lightmeter-remote can have a plurality of lighting models, each providing user instructions defining a lighting setup and requiring one or more light measurements.

It is an advantageous effect of the invention that an improved lightmeter-remote is provided that can provide camera exposure setup functions and, optionally, user instructions.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1A:
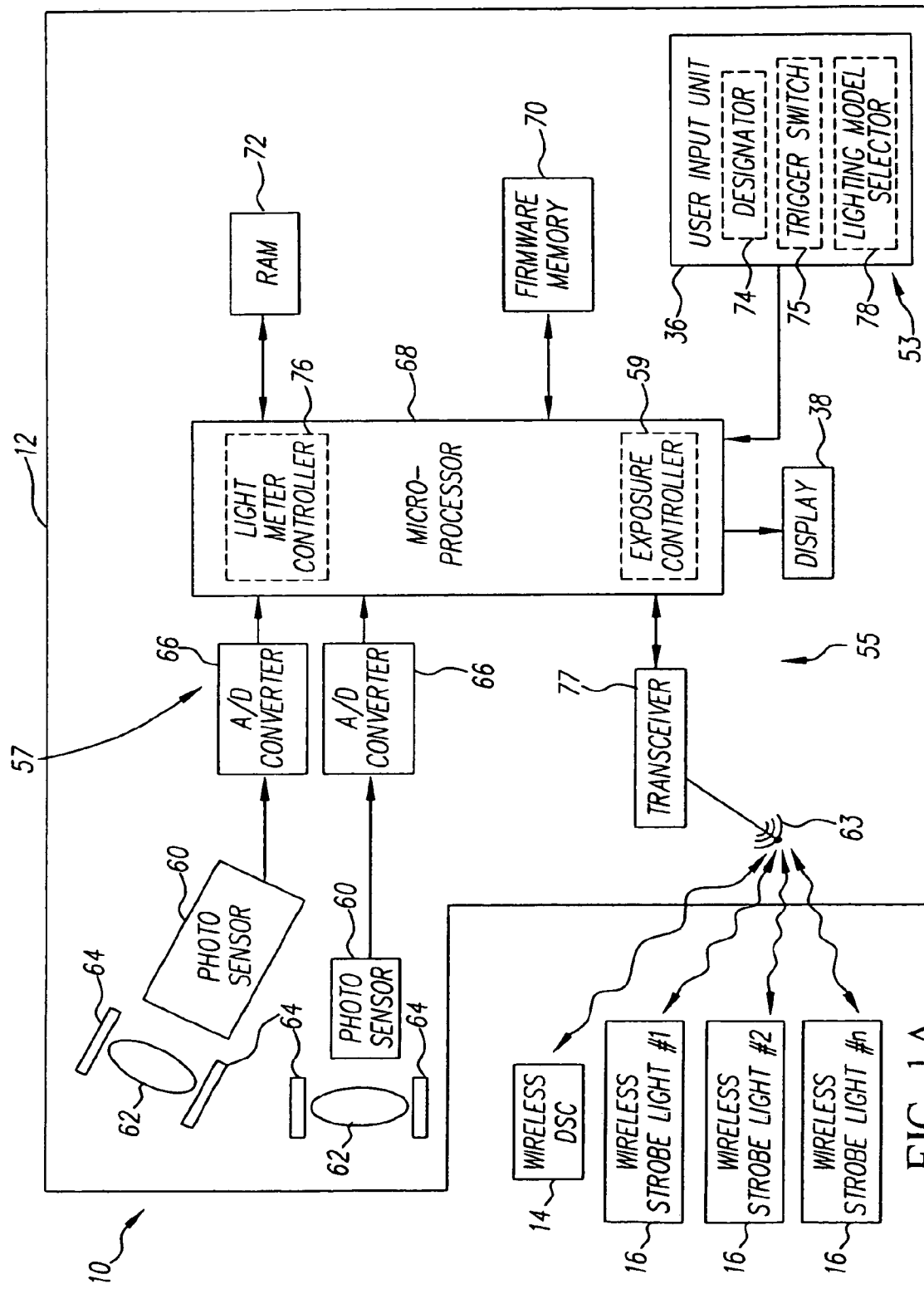
FIG. 1A is a diagrammatical view of an embodiment of the system, which includes an embodiment of the lightmeter-remote.
Figure 1B:
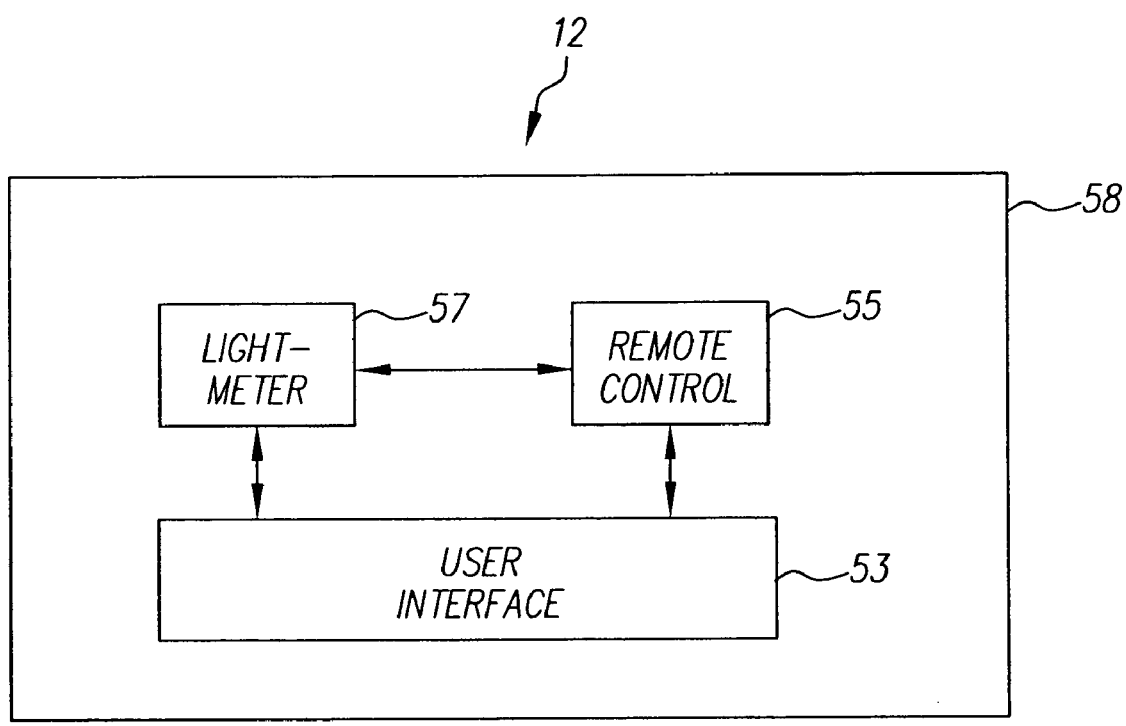
FIG. 1B is a more generalized diagrammatical view of the lightmeter-remote of FIG. 1A.

FIGS. 1A–1B illustrates a photographic system 10 having a lightmeter-remote 12, a remotely-settable camera 14, and a plurality of remotely-settable photolamps 16. The system can, optionally, include a computer 11. The term "photolamp" is used herein to refer to a photographic light source that has on (provides light) and off (does not provide light) states. For example, a photolamp can be a strobe light or other source that produces light in an intense burst or an incandescent lamp that emits light on a continuous basis in the on state or a continuous illuminant in combination with a feature that interrupts illumination in the off state. The system is generally discussed herein in relation to photolamps that are strobe lights. In FIG 1A, the photolamps 16 are strobe lights (labelled to show that any number of photolamps can be used: #1, #2, . . . #n) and the camera 14 is a digital still camera (DSC).

In a remotely-settable camera 14, exposure parameters of the camera, such as aperture, exposure time, and gain, can be set by wireless remote control from a distant location. Similarly, output parameters of a remotely-settable photolamp 16 can be set wirelessly from a distant location. The output parameter of a photolamp 16 can be limited to light output, or can include other characteristics, such as position of a light diffuser, angular position of a rotatable head, or position of a filter, or some combination of these and/or other characteristics effecting the light provided.

The camera 14 and photolamp 16 each have a release 15 and 17, respectively, that can be wirelessly triggered. Triggering operates the camera shutter (not shown) for picture taking and actuates the photolamp 16.

The camera 14 can generally be varied as desired for a particular use. For example, the camera 14 can use photographic film or can be electronic or a hybrid. Likewise, assuming appropriate photolamps 16, the camera 14 can be a still camera or video camera. For convenience, the invention is generally described herein in relation to a digital still camera.

Figure 2:
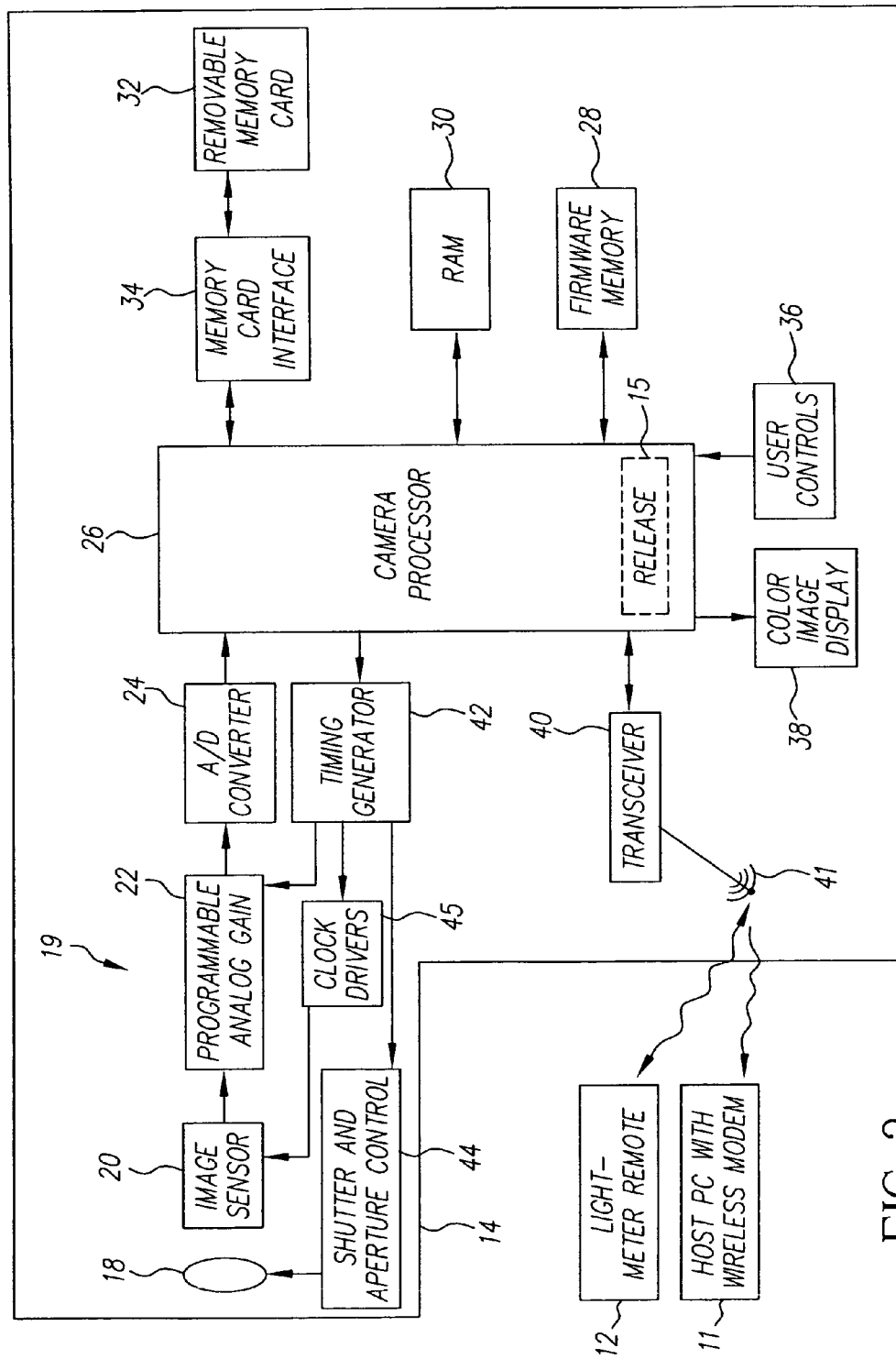
FIG. 2 is a diagrammatical view of the camera of the system of FIG. 1A. Also shown are the lightmeter-remote and a host personal computer.

Referring now to FIG. 2, in the digital still camera 14 shown, light images are captured in an exposure unit 19 and supplied to a camera processor 26, which is a programmable microprocessor or the like. In the exposure unit 19, a taking lens 18 provides light images to an image sensor 20. The analog image provided by the image sensor 20 is amplified by a programmable analog gain control 22 and then is sent to an analog to digital (A/D) converter 24. The A/D converter 24 converts the analog image to a digital image that is then sent to the camera processor 26.

The camera processor 26 is connected to firmware memory 28 that provides programming. The camera processor 26 is also connected to random access memory (RAM) 30 and separable rewritable memory 32, in the form of a removable memory card provided via a memory card interface 34. Also connected to the camera processor 26 are a user input unit 36, a color image display 38, a transceiver 40, and via a timing generator 42, the programmable gain control 22 and shutter and aperature control 44. The timing generator interacts with the image sensor 20 via clock drivers 45.

The camera 14 can communicate with a personal computer ("Host PC") or a local or remote network wirelessly or by wired connection, camera dock, or the like to transfer captured images. In the Figures, the transceiver 40 has an antenna 41 and can communicate with a wireless modem in the host personal computer 11 ("Host PC").

Figure 3:
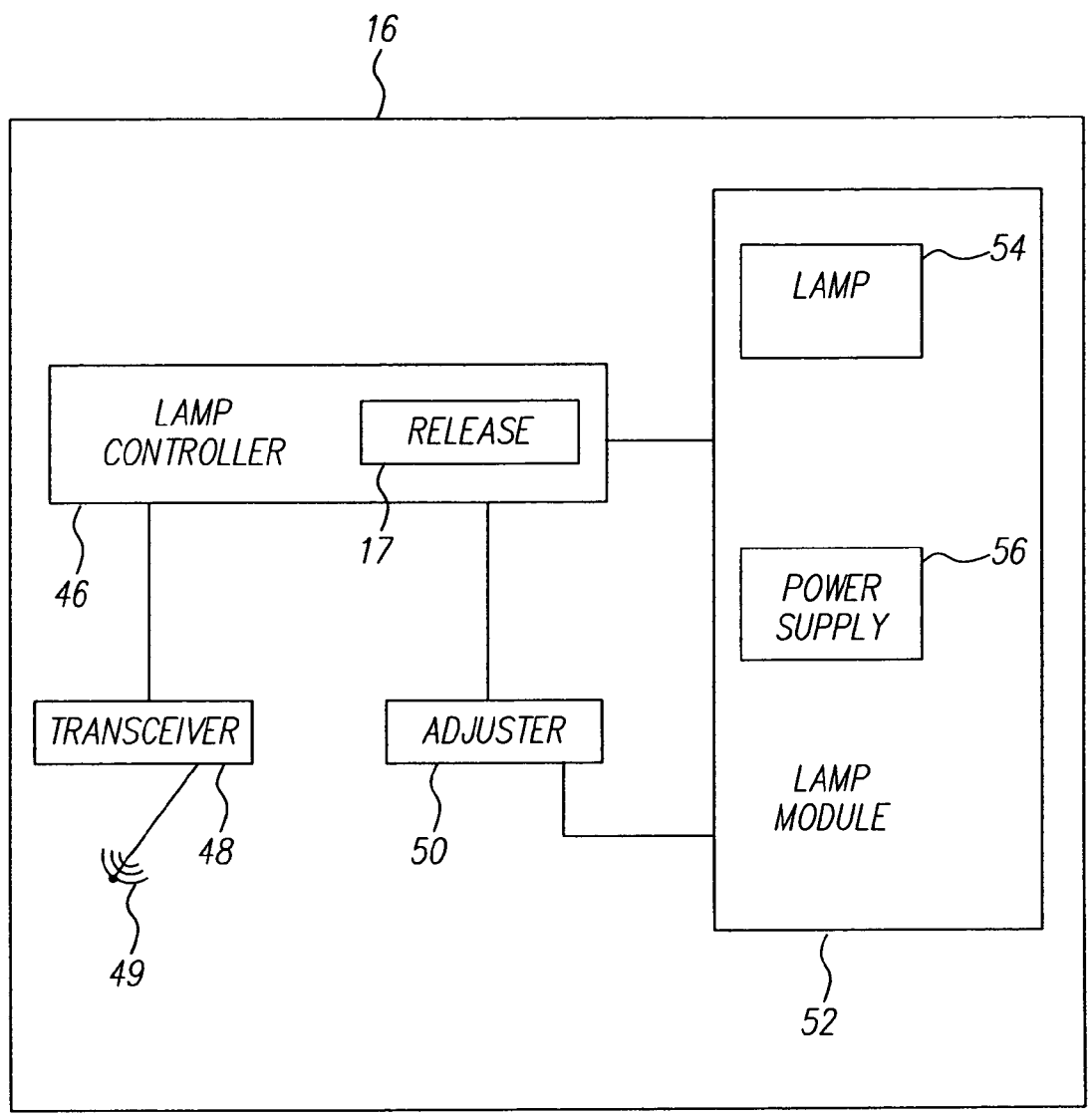
FIG. 3 is a diagrammatical view of one of the photolamps of the system of FIG. 1A.

Referring to FIG. 3, a photolamp 16 has a lamp controller 46, which can be a microprocessor. The lamp controller 46 is connected to a transceiver 48 and is also connected to an adjuster or output adjustment unit 50. The transceiver 48 has an antenna 49. The adjuster 50 operates on a lamp module 52 that includes a lamp 54 and power supply 56 for the lamp 54. The adjuster 50 changes output parameters of the photolamp 16. The output parameters can relate to any variable feature or features of the light provided by the photolamp, such as, color, intensity, output pattern, and direction. For example, the adjuster may change a power setting, turn a lamp head, change the location of the lamp head (e.g. the height or distance from the subject), change the shape of a reflector, or insert or remove a filter.

Referring to FIG. 1B, the lightmeter-remote 12 has a body 58 that holds a lightmeter 57, a remote control 55, and a common user interface 53 that includes the display 38 and user input unit 36. The lightmeter 57 and remote control 55 can be provided as completely separate circuits or can share some circuit elements, in addition to the user interface unit 53. In the embodiment shown in FIG. 1A, a microprocessor 68, random access memory 72, firmware memory 70, and display 38 are shared. The components of the lightmeter-remote 12 can be provided as discrete, dedicated units or one or more components can be provided by one or more appropriately programmed general purpose microprocessors or other circuit elements. The lightmeter-remote 12 is repeatedly actuable by the user to generate a series of light readings.

Referring again to FIG. 1A, the remote control 55 has an exposure controller 59 and a transceiver 77 (transmitter and receiver) that includes an antenna 63. In the embodiment shown, the exposure controller 59 is provided as a part of a programmed microprocessor 68. The exposure controller 59 can generate a set of wireless readying commands for the camera 14 and a set of wireless lighting adjustment commands for each of the photolamps 16. The exposure controller 59 can also generate wireless triggering commands for the camera 14 and photolamps 16. Suitable commands and components for these purposes are well known to those of skill in the art.

The lightmeter 57 has one or more photosensors 60. In the embodiment of FIG 1A, a pair of photosensors 60 are directed forward and offset at an angle, respectively. Each photosensor 60 receives light via a window 62 that may or may not have an optical power. Baffle members 64 can be provided to narrow the optical angles of the photosensors 60, if desired. The advantage of such baffled sensors is the capability of measuring lighting ratios using simulaneous measurements taken in two or more different directions and/or angles of view. A single photosensor can be used instead, as can a larger number of photosensors. The lightmeter 57 is not limited to traditional light meter functions, and can, if desired, measure other parameters of the light it receives, such as color temperature.

The output of photosensors 60 is sent through individual A/D converters 66 to the programmable microprocessor 68. The microprocessor 68 is connected to firmware memory 70 that provides programming and to RAM memory 72. The microprocessor 68 is also connected to a user input unit 36, display 38, and the transceiver 77. The programmed microprocessor 68 provides logical functions of a light meter controller 76 and the exposure controller 59. Separate controllers can alternatively be provided.

The user input unit 36 provides a designator 74 and a trigger switch 75 and, preferably, also includes a lighting model selector 78. Buttons or other user controls are provided for each of these components. In the embodiment shown in FIG. 5, a four-way navigation switch 82 is used to navigate hierarchical menus presented on the display. For example, side to side navigation (pushing the navigation switch on the right or left) can change from one menu item to another or from one hierarchical level of menu items to another. Up and down (pushing the navigation switch on the top or bottom) can change the selected choice. The choice can be actuated by pushing the button 80. (The display 38 is shown with menu items indicated generically by "<term>".)

The nature of user inputs required to operate the user interface unit is not critical. For example, addition buttons or other arrangements of control features can be provided, voice controls can be used, or the display 38 can include a touch screen (not designated in the figures) and soft buttons (not shown) defined by programming. The display 38 of the lightmeter-remote 12 can provide a graphical user interface or can be limited to text and simplified graphical information, such as text-based diagrams.

The lightmeter-remote 12 communicates wirelessly with the camera 14 and the photolamps 16. This communication can be by infrared radiation, but this is not preferred, since this presents a possible limitation to positioning of the lightmeter-remote 12 during use. For example, it is desirable for the user to be able to point the lightmeter-remote 12, take a reading, and then immediately transmit that reading, without repointing the lightmeter remote. This is often impractical with infrared transmission systems. It is preferred that the lightmeter-remote 12, camera 14, and photolamps 16 all include compatible radio-frequency transceivers 40,48,77, since within a limited range and using appropriate antennas, relative positioning of the different units does not effect communications. To reduce complexity, the transceivers 40,48,77 can be replaced by a transmitter in the lightmeter-remote 12 and receivers in the camera 14 and photolamps 16 (not separately illustrated). This provides minimal functionality, but has some shortcomings. For example, this approach eliminates the possible use of duplex messaging for error checking during transmissions. The type of radio-frequency communication used is not critical and can include a local area network under IEEE (Institute of Electrical and Electronics Engineers, Inc.) Standard 802.11b or a piconet under the "Bluetooth" defacto standard, the specifications of which are available on the World Wide Web at www.bluetooth.org.

The trigger switch 75 of the lightmeter-remote 12 can be actuated to individually trigger one or more of the photolamps 16, independent of the camera 14. It is preferred that the trigger switch 75 be actuable in three different conditions. In the first condition, the trigger switch 75 triggers a selected individual photolamp 16. In the second condition, the trigger switch 75 triggers all of the photolamps 16, independent of the camera 14. In the third condition, the trigger switch 75 triggers all of the photolamps 16 and the camera 14. As an alternative, in the first condition the trigger switch 75 triggers a selected photolamp 16 or group of two or more, but less than all of the photolamps 16.

The designator 74 of the lightmeter-remote 12 can be switched among different states to switch the trigger switch 75 among the three conditions and, in the first condition, to select a target photolamp 16 or group of photolamps 16.

The triggering of the photolamp or photolamps 16, without the camera 14, allows the user to take a reading of the emitted light, and adjust the power of the photolamp or photolamps 16 to achieve a desired light ratio. With a continuous emission photolamp 16, "triggering" is turning on the photolamp 16. The lightmeter-remote 12 can be configured, such that a second triggering turns off a continuous emission photolamp 16 or the photolamp 16 is automatically extinguished after a reading or a picture is taken.

The exposure controller 59 of the lightmeter-remote 12 generates signals that, when transmitted, set the exposure parameters of the digital camera 14 and the output of the photolamps 16. For example, in a particular embodiment, the exposure controller 59 can set aperture, exposure time, and gain of a digital camera 14. The lightmeter-remote 12 can optionally control other camera parameters that are unrelated to exposure, such as options related to compression and storage of a captured image.

The lightmeter-remote 12 can have multiple modes of operation that are settable by the user input unit 36. Different modes can change available features for easier use. A lighting model mode is discussed below in detail. Examples of other modes are a fully manual mode that deactivates remote functions, and a mode that limits remote functions to a camera trigger.

In particular embodiments, the lightmeter-remote memory 70 stores a number of different lighting models. Each model represents the characteristics of a particular arrangement of different lighting sources, including the relative positions of the lights, and the lighting ratio. The lighting ratio is the ratio of the illumination, measured at the subject's position, between the dominant light source and a secondary light source.

A lighting model defines an arrangement of lights used to achieve a particular desired illumination of a subject. Such lighting arrangements, also called lighting set-ups, are described in numerous photography publications. For example, the book *Portrait Photographer's Handbook* by Bill Hunter published in 2001 by Amherst Media, Inc. in Buffalo, N.Y., describes five basic portrait lighting setups. These portrait lighting setups imitate natural lighting by using one dominant light source to illuminate the subject, along with numerous secondary light sources. The key difference between the lighting setups is the placement of the dominant light, which is called the "key light 84". Each lighting setup can be used with a number of different lighting ratios. The lighting setup and lighting ratio together define the light model.

Figure 6A:
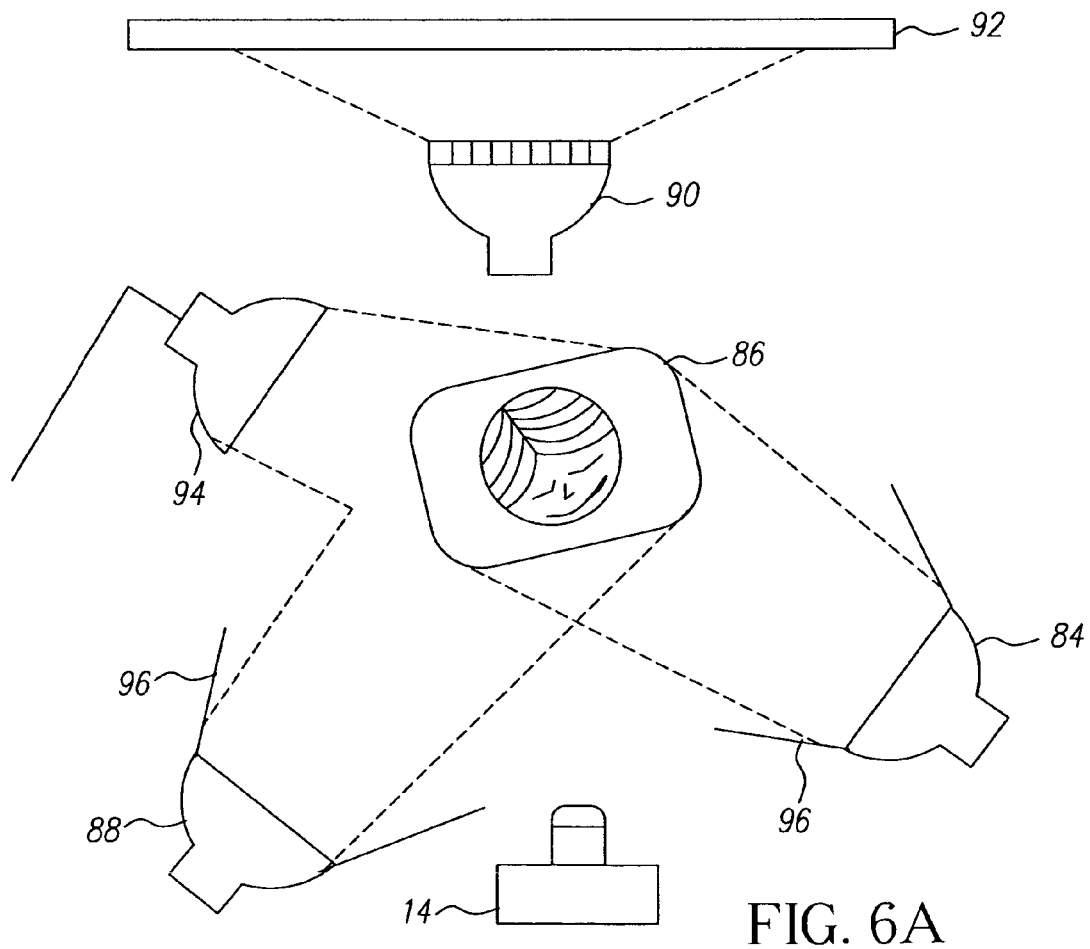
FIG. 6A and FIG. 6B are diagrammatical views of two portrait lighting setups.

FIG. 6A depicts a first lighting setup used for normal portrait lighting. In this lighting setup, a key light 84 illuminants the subject 86 at a position which is at an approximately 45 degree angle to the camera 14. The key light 84 is positioned on a light stand at approximately the height of the face of the subject 86. It is normally diffused, by using a frosted plastic screen in front of the reflector, by reflecting the light off of a reflective umbrella, or by using a soft box (not illustrated). A fill light 88 is also diffused, and is positioned higher on a stand, at a further distance than the key light 84, and on the opposite side of the camera 14. A background light 90 is used to illuminant a background 92, when the picture is taken in a studio. The background light 90 is normally a lower powered light on a small stand placed behind the subject 86, out of view of the camera lens. If the picture is taken outdoors, the ambient sunlight can take the place of the background light to illuminate the background scenery. A hair light 94 is a small light placed above the subject 86, opposite the key light 84, to illuminate the subject's hair. Barndoors (opaque reflectors) 96 can be used on one or more of the lights to help improve directionality and prevent flare light.

Figure 6B:
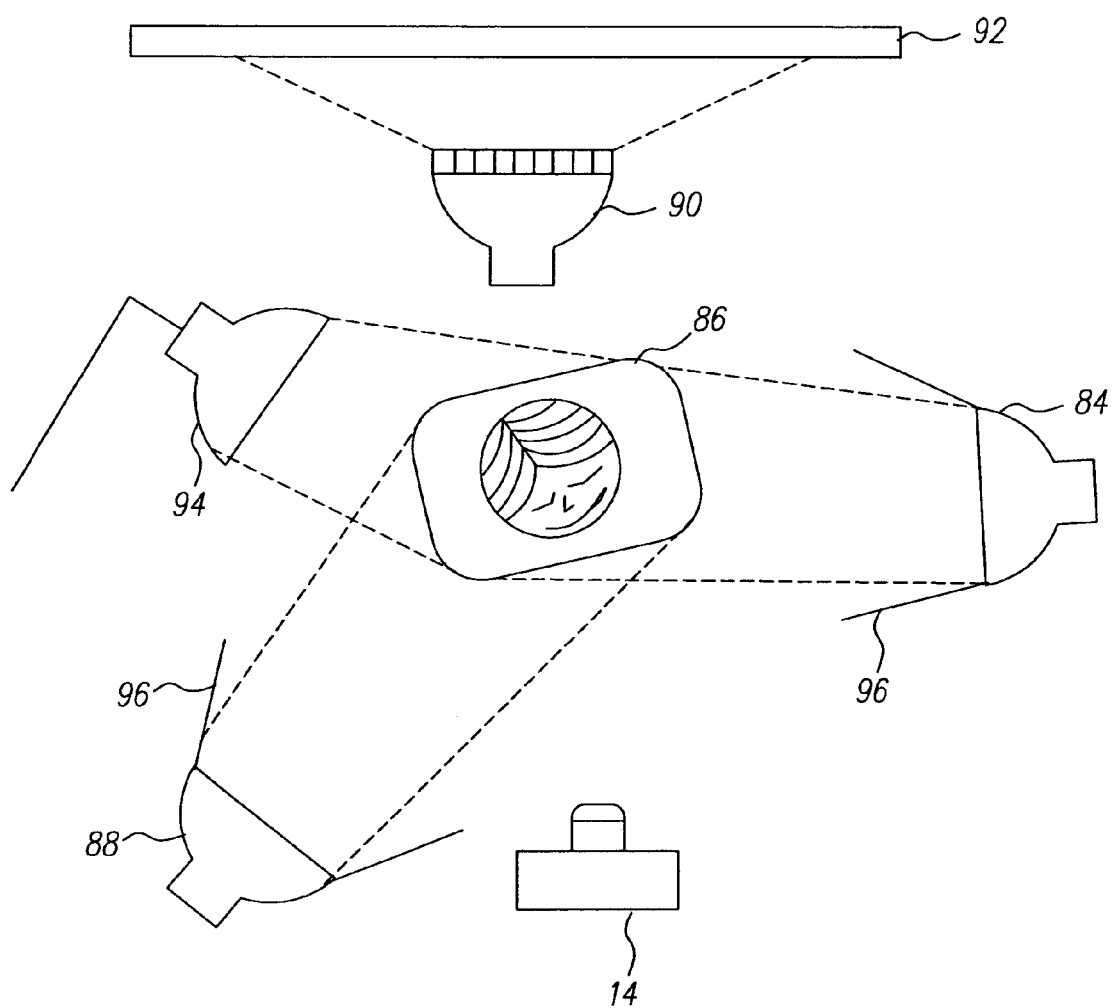

FIG. 6B depicts a second portrait lighting model, known as "Rembrandt lighting". This lighting model is named for the Dutch artist, who used skylight to illuminate the subjects he painted. It provides a more dramatic, masculine lighting effect than the normal portrait lighting in FIG. 6A, which is often used for feminine portraits. In the Rembrandt light model shown in FIG. 6B, the key light 84 is moved lower and farther to the side of the subject 86, so that the angle between the camera 14 and the key light 84 is slightly less than ninety degrees. The fill light 88, background light 90, and hair light 94 are in the same positions as in FIG. 6A.

As described in the *Portrait Photographer's Handbook* by Hunter, the term "lighting ratio" is the difference in light intensity between the shadow and highlight sides of the subject's face. For example, a 3:1 lighting ratio means that the highlight side has 3 times the illumination as the shadow side. A higher lighting ratio, such as a 4:1 ratio, makes the subject's face appear to be thinner and provides a more dramatic effect. A lower lighting ratio, such as a 2:1 ratio, is used to broaden a subject's face and is most desirable for high-key portraits with a white background and light clothing.

It will be understood that the lightmeter-remote memory 70 can store many other lighting models including different lighting setups and lighting ratios, in addition to those described in relation to FIGS. 6A and 6B.

Figure 5:
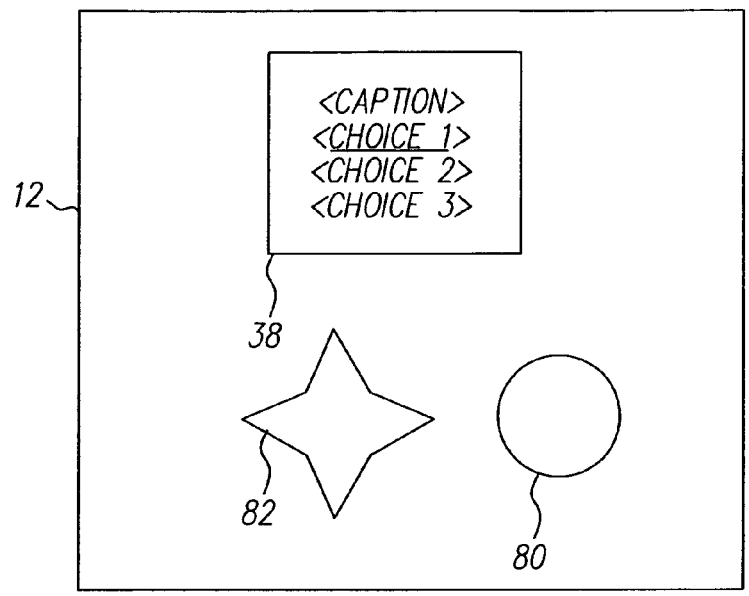
FIG. 5 is a semidiagrammatical front view of an embodiment of the lightmeter-remote.

The photographer selects one of the available lighting models as a current model, using the lighting model selector 78 that is part of the user input unit 74. The lighting model selector 78 can have a set of hierarchical menus, with choices that are selected using the designator and a button, as shown in FIG. 5. The specific features of the user interface used for the lighting model selector are not critical. For example, the lighting models can have permanently assigned buttons.

Each lighting model can include an instruction set. The lightmeter-remote 12 can show the instruction set on the display 38. The instruction set indicates photolamp placement and can indicate other information, such as lighting ratios for the respective lighting model. The instruction set can present information in summary form or step-by-step to accommodate users with different experience levels. With the step-by-step approach, user input is required for passage to the next step. The instruction set is described generally herein as text, but can be provided as diagrams or other images, or as a combination of text and images.

For example, drawings like FIGS. 6A and 6B can be shown as parts of instruction sets on the display of the lightmeter-remote. As another example, an instruction set can begin with a drawing, such as FIG. 6A or 6B and the caption, "Press button when ready". When the button is pressed the display can change to show a menu item like FIG. 5, with each of the photolamps listed as a choice and the caption, "Select and press button". The next menu item can be the caption, "Point lightmeter-remote toward <selected photolamp or other zone to be measured>" and press button". The button actuation would cause the lightmeter-remote to trigger the selected photolamp and capture a reading. The lightmeter-remote then sends one or more lighting adjustment commands that adjust the respective photolamp in accordance with the current lighting model. This can happen automatically following capture of the reading or can require a further user input. Automatic adjustment is quicker and simpler. Adjustment following user input allows user modification of settings and may be desirable for some experienced users.

The selection, measurement, and adjustment steps are repeated for the remaining photolamps. The lightmeter-remote captures the readings and associates the readings with the respective photolamp, in accordance with the respective lighting model.

The instructions can be further varied to meet the level of experience of the photographer. For example, instructions can force a new user to select each photolamp individually prior to taking readings and can allow an experienced user to take readings on each photolamp, one after another, without further interaction until all readings are captured.

The lighting model can include sets of initial lighting adjustment commands and camera readying commands that are transmitted prior to light measurements to set initial values. Alternatively, measurements can be required prior to adjustment of the camera and photolamps.

Figure 4A:
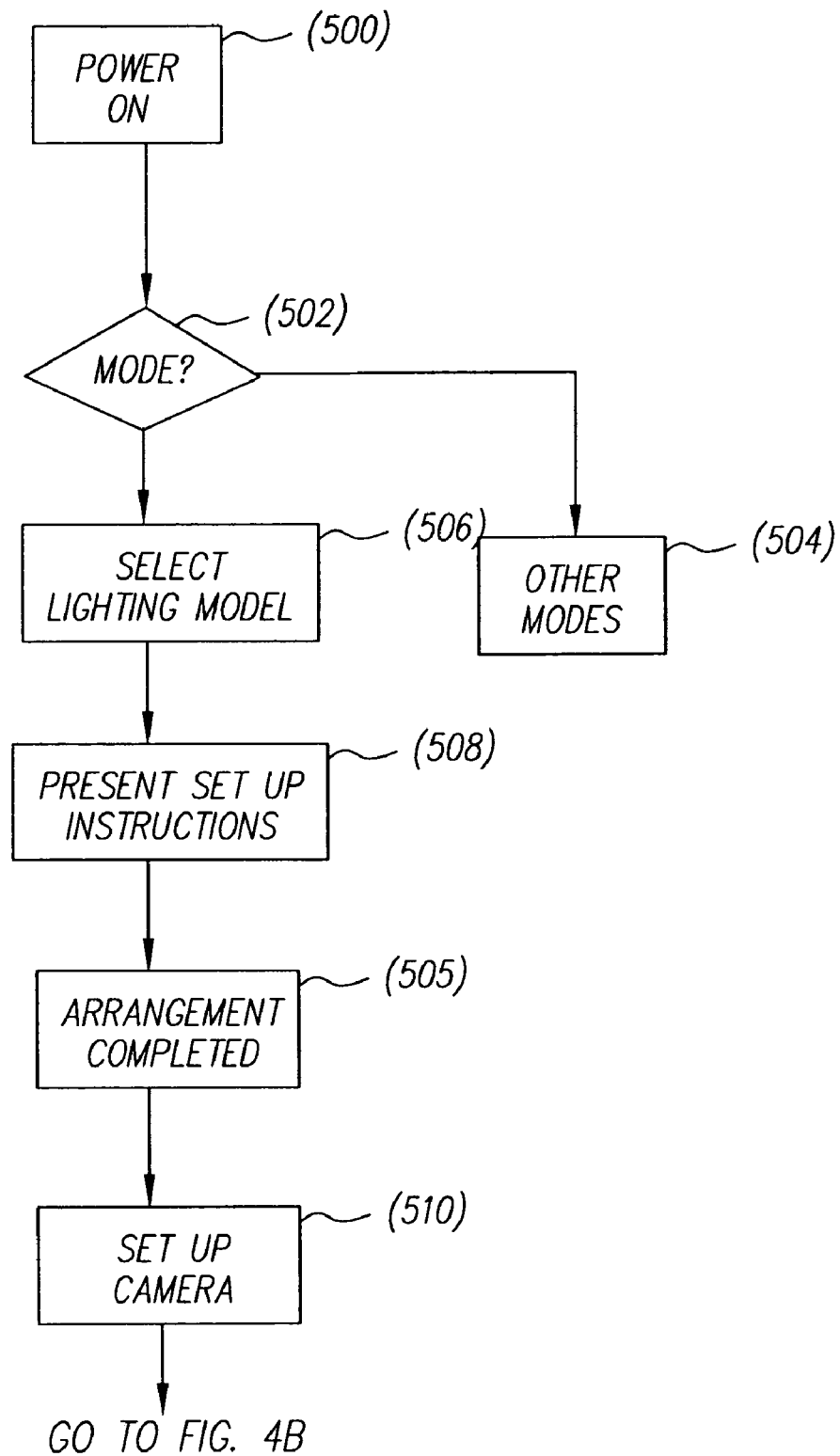
FIGS. 4A–4B are a flow chart of an embodiment of the method of the invention in a lighting model selection mode.
Figure 4B:
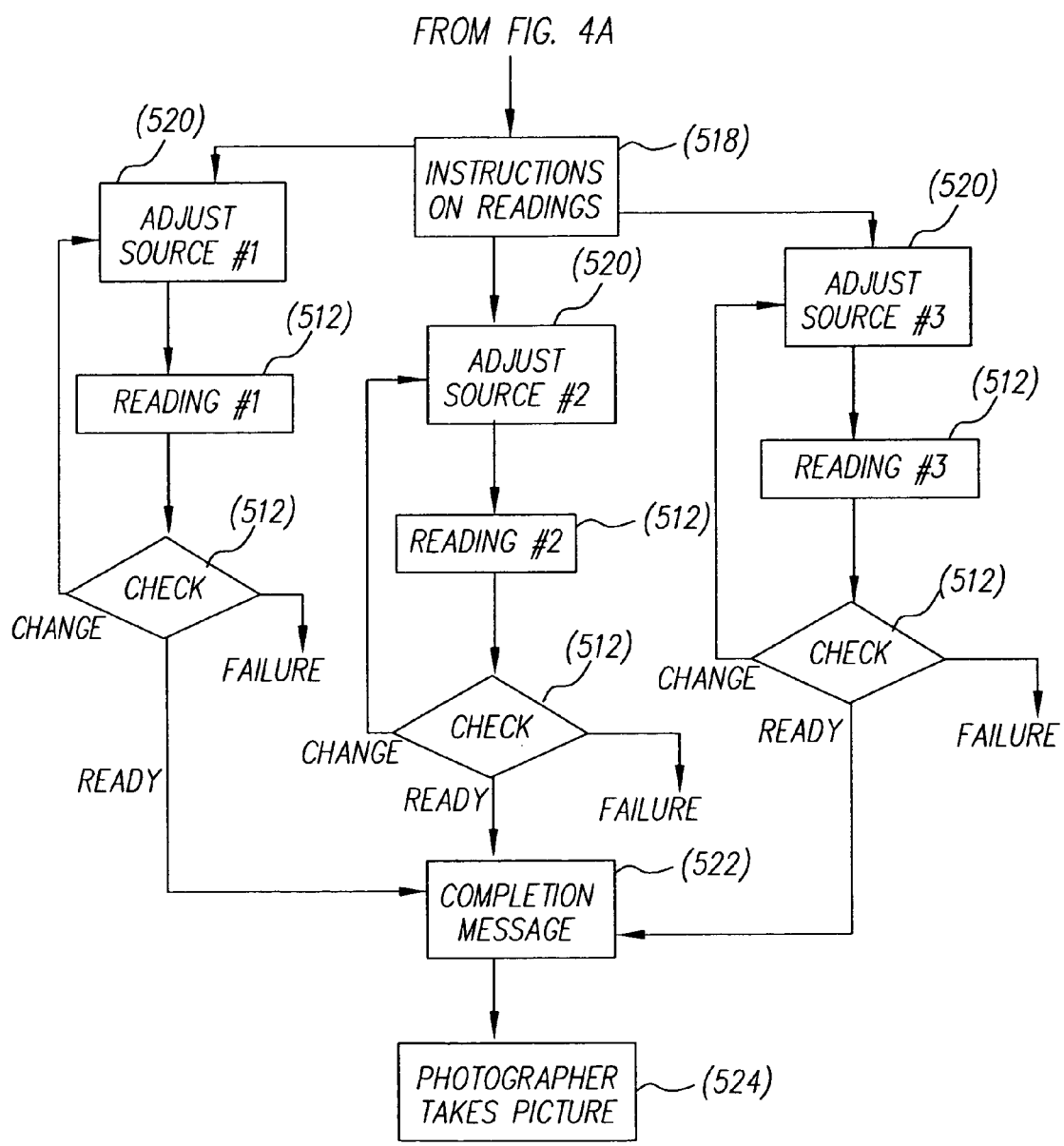

A flow chart of an example of operation of the lightmeter-remote 12 is shown in FIGS. 4A–4B. In this example, strobe lights are used as photolamps 16. The lightmeter-remote 12 is powered on (500) and an operation mode is selected (502) by the photographer using the user input unit 74. In FIG. 4, a mode is selected (502), in which a lighting model is then selected (506).

If the photographer selects (502) another mode, then user operation follows steps (504) appropriate for the selected mode. For example, if the photograph will be taken using a natural background and lighting, such as an outdoor photograph illuminated using sunlight, the photographer might decide to use the lightmeter-remote in a fully manual mode, in the same manner as a conventional light meter.

FIG. 4 illustrates a pair of different modes. In one, the photographer selects (506) the lighting model. In another, the lighting model is selected (506) by the microprocessor 68 of the lightmeter-remote 12.

Figure 7A:
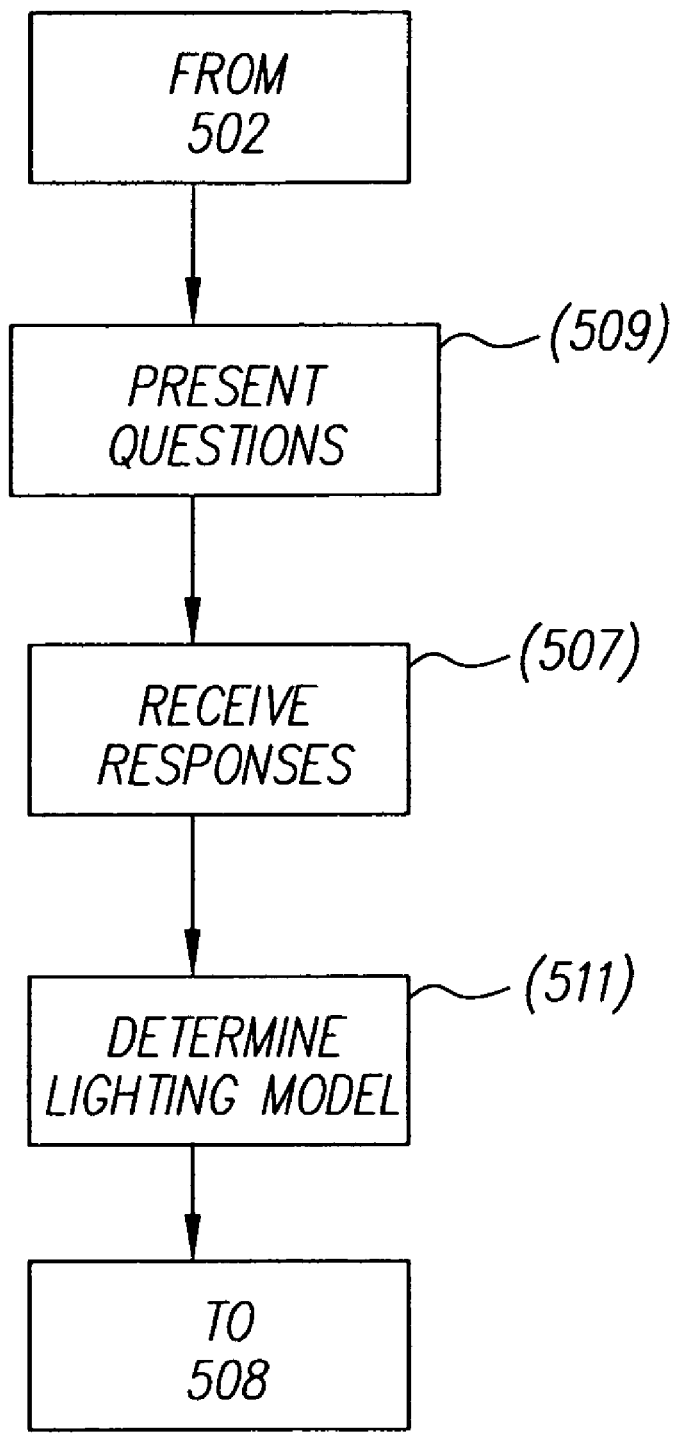
FIGS. 7A and 7B are flow charts of the selecting step in two different lighting model selection modes of the embodiment of FIG. 4.

In the mode shown in FIG. 7A, the microprocessor makes a determination (511) based upon responses received (507) when an interactive instruction set is presented (509) by the lightmeter-remote. The responses can be answers to questions. For example, the instructions can ask the questions: Is the picture a portrait? Are there one or more persons? What is the gender of a subject? The responses can also be lightmeter readings or a combination of answers and readings. For example, instructions can ask the photographer to take readings of the subject and existing light sources and then indicate a number of persons and gender. If desired, a lightmeter-remote can provide photographer selection of a lighting model, or microprocessor selection of a lighting model, or both as different modes.

Figure 7B:
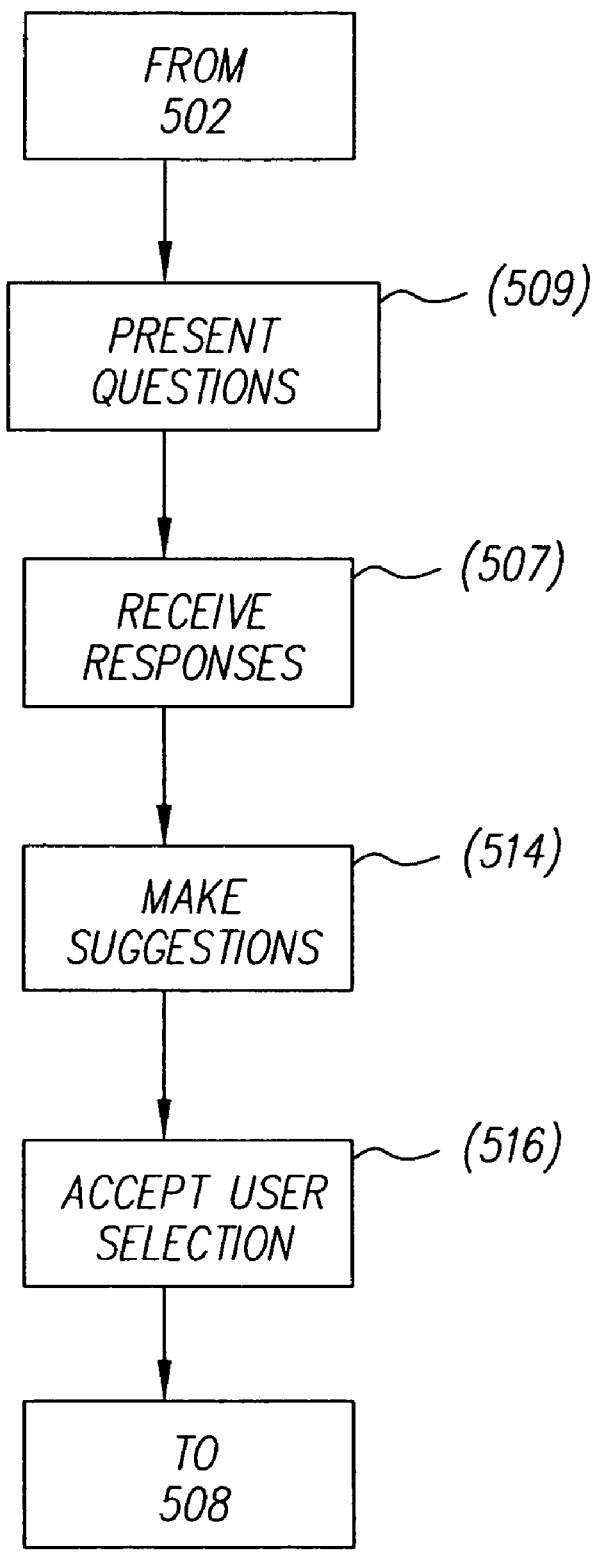

In another mode shown in FIG. 7B, the microprocessor 68 can make suggestions (514) of a lighting model or different lighting models based upon user responses. For example, the lightmeter-remote can suggest (514) the normal portrait lighting setup shown in FIG. 6A with a 2:1 lighting ratio for a feminine subject with a slender face wearing a light outfit. The lightmeter-remote can also suggest (514) the Rembrandt lighting model shown in FIG. 6B with a 4:1 lighting ratio for a masculine subject with a broader face wearing a dark outfit. In this case the user completes the selection (506) by affirming the suggestion or rejecting the suggestion(s) and selecting another choice. The lightmeter-remote accepts (516) and implements the user choice.

After the lighting model is selected, the lightmeter-remote 12 presents (508) setup instructions on the display 38. The photographer arranges the photolamps 16 and camera 14 as shown or described by the instructions presented by the display 38. The light arrangement can, for example, provide a graphic which depicts the lighting arrangement shown in FIG. 6A, if the corresponding lighting model was selected. The photographer signals completion of the arrangment to the lightmeter-remote by pressing a button or the like. The lightmeter-remote receives (505) the completion signal and continues with the instructions.

In FIGS. 4A–4B, the lightmeter-remote 12 sets up (510) the camera for the selected lighting model. The lightmeter-remote optionally determines depth of field from current camera settings. This can be done by communicating with the camera 14 to determine the focal length of the taking lens 18, the focus distance of the taking lens, and the current aperture (f-stop). This information can be conveyed to the photographer graphically or by text. The user input unit 36 can be usable to change camera settings (not shown). The lightmeter-remote can then iterate depth of field determinations as needed. Alternatively, the photographer can manipulate the user input unit 36 to directly change a depth of field range presented on the display 38. The lightmeter-remote, in this case, then changes camera settings to provide the desired result.

The lightmeter-remote can provide other camera setup features (not shown). For example, the lightmeter-remote can, with appropriate instructions to the photographer, autofocus the camera on a subject and, with the subject absent, autofocus on a backdrop. The microprocessor 68 can compare this information to the depth of field and convey that result to the user.

Referring again to FIGS. 4A–4B, the photographer inputs (512) readings of light sources according to instructions presented (518) on the display 38 of the lightmeter-remote 12. As instructed by the lightmeter-remote 12, to take readings the photographer moves to a measurement location (which can be indicated in the instructions), points an indicated one of photosensors 60 of the lightmeter-remote 12 in an indicated direction, and actuates taking of a reading using the user input unit 36. The measurement location is, mostly conveniently, the position of the subject of the proposed photograph. One or more other locations can be used if the lightmeter-remote 12 has the capability of balancing out differences in readings due to offsets from the subject.

After readings are taken (512), the lightmeter-remote checks (520) the readings against the lighting model and adjusts (520) the light output level of each photolamp 16, as necessary, to achieve the desired overall light level and the desired lighting ratio. The lightmeter-remote 12 communicates with the respective photolamps 16 and instructs the respective lamp controllers 46 to set the necessary illumination levels. When all photolamps are ready, the lightmeter-remote notifies (522) the user that the light model parameters have been met and setup is completed. The photographer can then take (524) the picture.

If it is impossible to achieve the desired light level or illumination level with one or more photolamps, the lightmeter-remote 12 provides a failure notice or other appropriate instruction message to the photographer. The message may suggest that one or more photolamps 16 be altered, for example, by changing light reflectors, or repositioned, for example, by moving a fill photolamp further from the subject, in order to achieve the selected lighting model. The lightmeter-remote 12 can also suggest changes in camera settings. Such changes can be implemented by the lightmeter-remote 12 automatically or under the control of the photographer. The photographer can also be given the option of changing camera and photolamp parameters manually, that is, changing to a manual or semi-manual mode, or selecting a different light model mode.

After making changes, the lightmeter-remote repeats instructions for taking readings and again compares the light levels to the current lighting model and provides instructions to the user. The process is repeated until the model parameters are met or the user has changed modes.

As lighting levels and ratios are changed, it may be necessary or desirable to change camera settings. This can occur continuously as photolamps are adjusted or can be deferred until a desired level and ratios are met. In that case, after the adjustment of the photolamps and/or other light sources, the lightmeter-remote readies the exposure unit of the camera by setting camera parameters, such as gain, aperture, and shutter speed. The lightmeter-remote next displays an indication that the model parameters including final camera settings, have been met. The photographer can then trigger the camera 14 and photolamps 16 to capture one or more images of the subject using the selected lighting model. If desired, the camera trigger on the lightmeter-remote 12 can be locked out until the requirements of an instruction set have been met.

A natural background is handled in a similar manner to other light sources, with the exception that, absent reflectors or the like, natural light cannot be adjusted. For example, in an appropriate lighting model, the user is instructed to point the lightmeter-remote in the direction of the natural background and provide an input via the user input unit 36. A light reading is then taken of the ambient sunlight illumination level, without firing any of the photolamps 16. This reading can then be used to set the camera exposure time in order to provide an appropriate background illumination level when the subject is later illuminated by the photolamps 16. Since the photolamps illuminate the subject for a very short period, relative to the camera exposure time, adjusting the camera exposure time to a longer time period makes the natural background appear brighter.

The user input unit 36 of the lightmeter-remote 12 can trigger photolamps 16 one at a time, and measures the illumination from each photolamp separately. Alternatively, the user input unit 36 of the lightmeter-remote 12 can trigger all of the photolamps 16 to fire simultaneously or in groups. For example, the lightmeter-remote of FIG. 1 can simultaneously trigger both a key photolamp 84 and a fill photolamp 88. In this case, the lightmeter-remote 12 takes light readings using both photosensors 60. This enables the lightmeter-remote to measure both the highlight and shadow illumination at the same time, in order to directly measure the lighting ratio. The lighting ratio is the ratio of the sum of the key and fill lamp levels, which provides the highlight illumination, to the fill light level, which provides the shadow illumination level.

Figure 4C:
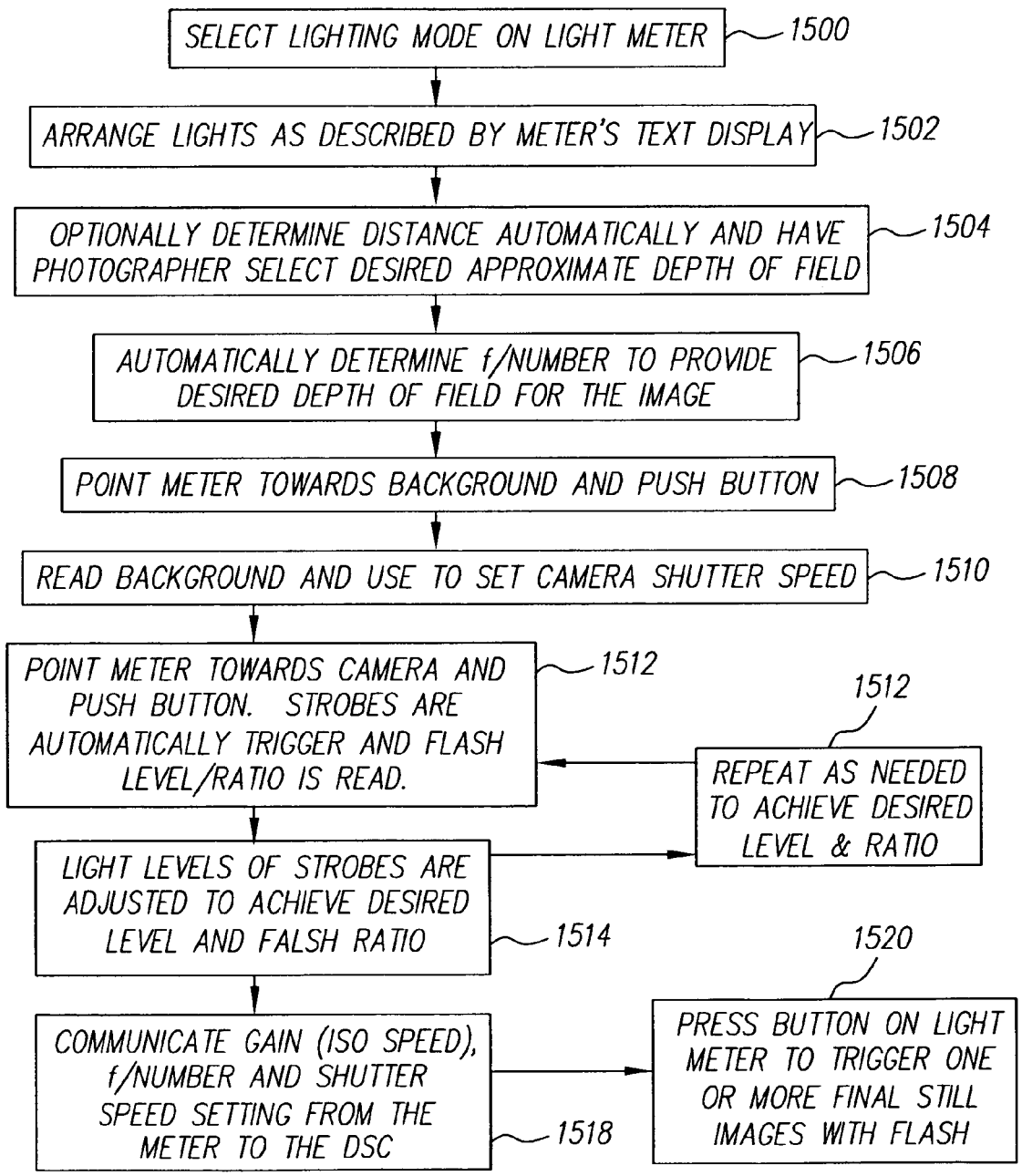
FIG. 4C is a flow chart of the method, in another lighting model selection mode.

Use of the lightmeter-remote in another lighting model mode is shown in FIG. 4C. In this case, after the mode is selected (not shown), the lighting model is selected (1500) and photolamps (strobe lights) are arranged (1502) as described in a text display of the lightmeter-remote. As an option, the lightmeter-remote determines (1504) distance to the subject automatically and allows the user to select a desired approximate depth of field. The lightmeter-remote then automatically determines (1506) an f/number to provide the desired depth of field for the image to be captured. The user then follows instructions on the display and takes (1508) a reading on the background by pointing the lightmeter toward the background for the image and pushing the button. The lightmeter-remote makes the measurement and uses (1510) the measurement to set the camera shutter speed. The user then follows instructions on the display and takes (1512) another reading by pointing the lightmeter toward the camera and pushing the button to fire all the photolamps to provide a flash level ratio reading. The lightmeter-remote makes the measurement and adjusts (1514) light levels of the photolamps to achieve the lighting model's level and flash ratio. The reading (1512) and adjusting (1514) steps are repeated as needed to achieve the particular level and flash ratio. Gain/ISO speed or equivalent, f/number, and shutter speed settings are then transmitted (1518) from the lightmeter-remote to the camera (DSC). The user then presses (1520) the button on the lightmeter-remote to trigger the camera and photolamps and capture one or more images.

The invention has been described in detail with particular reference to certain preferred embodiments thereof, but it will be understood that variations and modifications can be effected within the spirit and scope of the invention.

What is claimed is:

1. A lightmeter-remote for use with a remotely settable camera and a plurality of remotely settable photolamps, said lightmeter-remote comprising:
    a body;
    a lightmeter disposed in said body;
    an exposure controller disposed in said body, said exposure controller being selectively actuable to set aperture, exposure time, and gain parameters of the camera and to set output parameters of each of the photolamps; and
    a transmitter operatively and wirelessly connecting said camera and said photolamps with said exposure controller.

2. The lightmeter-remote of claim 1 further comprising:
    a trigger switch operatively connected to said transmitter, said trigger switch being selectively actuable in a first condition to trigger one of said photolamps independent of said camera, and in a second condition to simultaneously trigger all of said photolamps independent of said camera.

3. The lightmeter-remote of claim 1 wherein said trigger switch is selectively actuable in a first condition to trigger a selected one of said photolamps independent of said camera, in a second condition to trigger all of said photolamps independent of said camera, and in a third condition to trigger said camera and all of said photolamps.

4. The lightmeter-remote of claim 1 further comprising:
    a user input unit disposed in said body, said user input unit having a designator switchable among a plurality of states to designate a selected one of said photolamps as a target photolamp, said user input unit having a trigger switch operatively connected to said transmitter, said trigger switch being selectively actuable to trigger said target photolamp or all of said photolamps.

5. The lightmeter-remote of claim 1 wherein said lightmeter is repeatedly actuable to generate a series of light readings; and said lightmeter-remote further comprises:
    a memory disposed in said body, said memory having a plurality of lighting models, each said lighting model having one or more required light measurements;
    a user input unit mounted to said body, said user input unit being actuable to select one of said lighting models as a current model and to associate individual said light readings with each of said required light measurements.

6. The lightmeter-remote of claim 1 wherein said lightmeter includes a plurality of sensors, said sensors being differently oriented and baffled, wherein said lightmeter is capable of measuring lighting ratios.

7. The lightmeter-remote of claim 1 wherein said transmitter transmits radio-frequency electromagnetic radiation to said camera and said photolamps.

8. A lightmeter-remote for use with a remotely settable camera and a plurality of remotely settable photolamps, said lightmeter-remote comprising:
    a body;
    a lightmeter disposed in said body, said lightmeter being repeatedly actuable to generate a series of light readings corresponding to ambient light;
    a memory disposed in said body, said memory having a plurality of lighting models, each said lighting model having one or more required light measurements;
    a user input unit mounted to said body, said user input unit being actuable to select one of said lighting models as a current model and to associate individual said light readings with each of said required light measurements;
    an exposure controller operatively connected to said lightmeter, said memory, and said user input unit, said exposure controller being selectively actuable to generate a camera setting signal and a plurality of photolamp setting signals responsive to said light readings and said current model; and
    a transmitter disposed in said body, said transmitter being operatively connected to said exposure controller, said transmitter being capable of wirelessly communicating said camera setting signal to said camera and said photolamp setting signals to respective said photolamps.

9. The lightmeter-remote of claim 8 further comprising:
    a display mounted to said body, said display being operatively connected to said exposure controller.

10. The lightmeter-remote of claim 9 wherein said lighting models each have an instruction set presentable on said display.

11. The lightmeter-remote of claim 10 wherein said instruction sets are interactive via said user input unit.

12. The lightmeter-remote of claim 10 wherein said instruction set includes graphical information.

13. The lightmeter-remote of claim 8 wherein said user input unit has a designator switchable among a plurality of states to designate a selected one of said photolamps as a target photolamp, said user input unit having a trigger switch operatively connected to said transmitter, said trigger switch being selectively actuable to trigger said target photolamp and to alternatively trigger said camera and all of said photolamps.

14. The lightmeter-remote of claim 8 wherein said lightmeter includes a plurality of sensors, said sensors being differently oriented and baffled, wherein said lightmeter is capable of measuring lighting ratios.

15. A photography system comprising:
    a camera having an exposure unit adjustable by a set of wireless readying commands, said camera having a release triggerable by a wireless camera trigger command;
    a plurality of remotely controllable photolamps, said photolamps each having a release triggerable by a wireless lamp trigger command and an output adjustment unit adjustable by a set of wireless lighting adjustment commands; and
    a lightmeter-remote including:
        a body;
        a lightmeter disposed in said body, said lightmeter being repeatedly actuable to generate a series of light readings corresponding to ambient light;
        a memory disposed in said body, said memory having a plurality of lighting models, each said lighting model having one or more required light measurements;

a user input unit mounted to said body, said user input unit being actuable to select one of said lighting models as a current model and to associate individual said light readings with each of said required light measurements;

an exposure controller operatively connected to said lightmeter, said memory, and said user input unit, said exposure controller being selectively actuable to generate a camera setting signal and a plurality of photolamp setting signals responsive to said light readings and said current model; and a transmitter disposed in said body, said transmitter being operatively connected to said exposure controller, said transmitter being capable of wirelessly communicating said camera setting signal to said camera and said photolamp setting signals to respective said photolamps.

16. The system of claim 15 wherein said user input unit has a designator switchable among a plurality of states to designate a selected one of said photolamps as a target photolamp, said user input unit having a trigger switch operatively connected to said transmitter, said trigger switch being selectively actuable to trigger said target photolamp and to alternatively trigger said camera and all of said photolamps.

17. The system of claim 16 wherein said lightmeter-remote further comprises a display mounted to said body, said display being operatively connected to said exposure controller; and said lighting models each have an instruction set presentable on said display.

18. A method for setting up a camera and a plurality of photolamps, said method comprising the steps of:

individually and wirelessly triggering each of said photolamps responsive to a user input;

measuring a lighting value consequent to each said triggering;

automatically and wirelessly adjusting light output of said photolamps responsive to said measuring steps;

following said triggering, wirelessly readying an exposure unit of said camera, responsive to said measuring and adjusting.

19. The method of claim 18 further comprising displaying user instructions identifying each said photolamp prior to the respective said triggering.

20. The method of claim 18 further comprising wirelessly triggering said camera following said readying.

21. The method of claim 18 further comprising, prior to said triggering:

accepting a user selection of one of plurality of lighting models to provide a selected lighting model, said lighting models each including a plurality of displayable instructions; and displaying said instructions of said selected lighting model responsive to said user selection.

22. The method of claim 21 further comprising accepting interactive user input during said displaying.

23. The method of claim 22 further comprising revising said instructions responsive to said user input.

24. The method of claim 23 further comprising revising said instructions responsive to said measuring.

* * * * *